US006863809B2

(12) United States Patent
Smith et al.

(10) Patent No.: US 6,863,809 B2
(45) Date of Patent: Mar. 8, 2005

(54) SHALE BIN/SETTLING TANK/CENTRIFUGE COMBINATION SKID

(75) Inventors: Donald Roy Smith, Calgary (CA); Melvin Douglas Kapicki, Leduc (CA)

(73) Assignee: BOS Rentals Ltd., Calgary (CA)

( * ) Notice: Subject to any disclaimer, the term of this patent is extended or adjusted under 35 U.S.C. 154(b) by 20 days.

(21) Appl. No.: 10/366,050

(22) Filed: Feb. 13, 2003

(65) Prior Publication Data

US 2004/0112816 A1 Jun. 17, 2004

(30) Foreign Application Priority Data

Dec. 13, 2002 (CA) .............................................. 2414321

(51) Int. Cl.$^7$ .............................................. B01D 21/01
(52) U.S. Cl. ..................... 210/202; 210/170; 210/167; 210/195.1; 210/241; 210/258; 210/259; 210/261
(58) Field of Search ................................ 210/202, 199, 210/170, 195.1, 167, 241, 521, 533, 512.3, 258, 259, 261, 254, 262

(56) References Cited

U.S. PATENT DOCUMENTS

| 4,378,290 A |   | 3/1983 | Kennedy, Jr. |          |
|-------------|---|--------|--------------|----------|
| 4,474,254 A |   | 10/1984| Etter et al. |          |
| 4,536,286 A |   | 8/1985 | Nugent       |          |
| 4,659,460 A |   | 4/1987 | Muller et al.|          |
| 5,312,551 A | * | 5/1994 | Perron et al.| 210/712  |
| 5,626,748 A |   | 5/1997 | Rose         |          |
| 6,391,195 B1| * | 5/2002 | Layton       | 210/195.1|

FOREIGN PATENT DOCUMENTS

| CA | 2219053  | 11/1997 |
| DE | 19507172 | 8/1996  |
| FR | 2636669  | 5/1990  |
| GB | 2 197 648| 5/1988  |

OTHER PUBLICATIONS

Canon, "Drilling Fluids With Solids Removal Systems," www.surfacetosurface.com/support.
"Drilling Rig and Ancillaries," Petroleum Industry Training Service, Drilling Engineering, vol. 1, Ch. 3, pp. 125–152 (1995).
"Drilling Fluids," Petroleum Industry Training Service, Drilling Engineering, vol. 1, Ch. 4, pp. 63–82 (1995).

* cited by examiner

*Primary Examiner*—Duane Smith
*Assistant Examiner*—Douglas Theisen
(74) *Attorney, Agent, or Firm*—Leydig, Voit & Mayer, Ltd.

(57) ABSTRACT

A transportable drilling fluid cleaning system for removing solids from drilling fluid at a drill site comprises a platform for transporting the system. A bin region on the platform retains solids from the drilling fluid. A settling tank on the platform separates the drilling fluid into an upper fluid fraction having a reduced concentration of solids and a lower solids fraction having a higher concentration of solids as the drilling fluid flows from an inlet chamber for receiving drilling fluid to at least one other chamber. A stand on the platform supports at least one centrifuge for separating the solids from the drilling fluid, the stand being movable between stored and operating positions. The system provides a self-contained unit that is easily transportable on a flat bed truck to provide all the ancillary equipment necessary for solids control at the drill site.

40 Claims, 11 Drawing Sheets

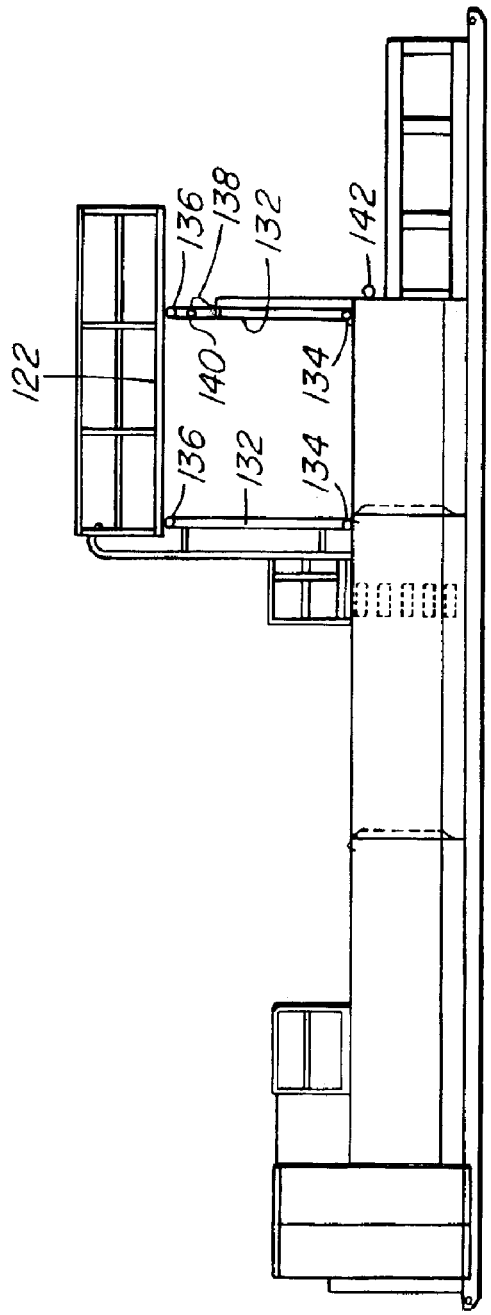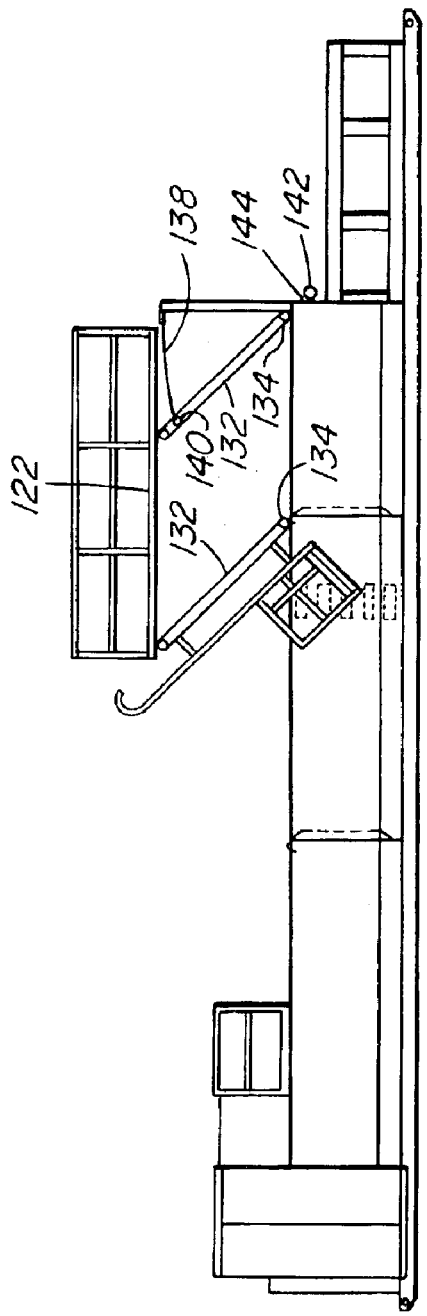
FIG. 7a
FIG. 7b

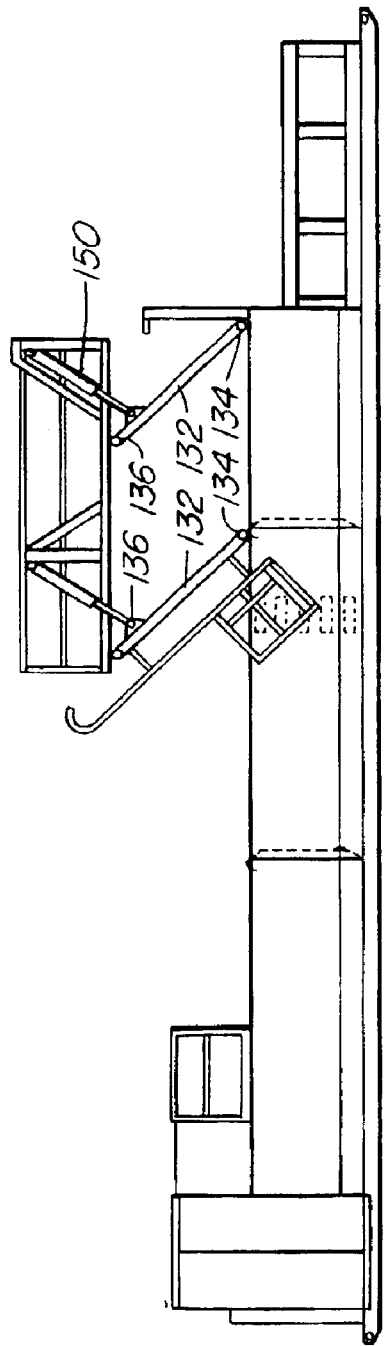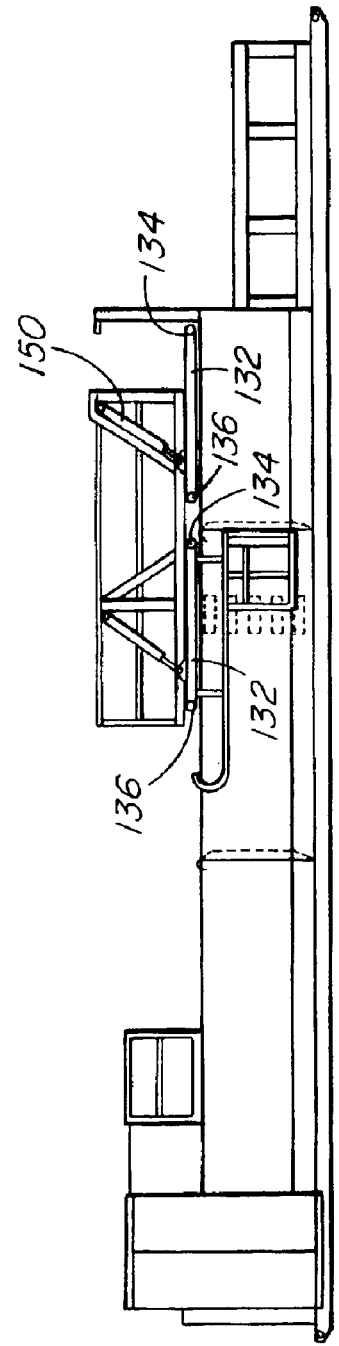

SHALE BIN/SETTLING TANK/CENTRIFUGE COMBINATION SKID

This application claims priority to Canadian Patent Application No. 2,414,321, entitled "Shale Bin/Settling Tank/Centrifuge Combination Skid," filed on Dec. 13, 2002, which is hereby incorporated by reference.

FIELD OF THE INVENTION

This invention relates to apparatus for separating solids from fluids. In particular, the apparatus is useful for removing solids from drilling fluids used in well drilling operations.

BACKGROUND OF THE INVENTION

Wells for recovering oil, gas and the like are typically created by drilling into an underground source using a hollow drill string supported in a drilling rig. The drill string includes a drill bit at the lower end that is rotated into the ground to create a well bore. As the drill bit is rotated, drilling fluid is pumped down through the interior of the drill string to pass through the bit and return to the surface in the well bore external to the drill string. The drilling fluid acts to lubricate the drill bit and carries the loose solids created by the drill bit to the surface. At the surface, the used drilling fluid is collected and recycled by removing some or all of the solids. The viscosity or solids content of the drilling fluid can be varied depending on the stage of the drilling process and the location of the drill bit below the surface.

Equipment and methods for handling the drilling fluid to remove solids in order to recycle the fluid are well known. Settling tanks, shale shakers, flocculating tanks and centrifuge or cyclone separators can be interconnected to handle the drilling fluids from a drill site and separate the used drilling fluid and undesirable solids for subsequent recycling of the drilling fluid. Canadian Patent No. 2,219,053 issued May 25, 1999 to Grand Tank (International) Inc. discloses an arrangement of settling tanks and centrifuges to achieve this result.

Presently, a mud storage tank to hold drilling fluid and a shale shaker to perform screening of larger solids tend to be standard equipment for a drilling rig. In normal well site operation, drilling fluid is circulated out of the a borehole and passed over a shale shaker which is a screen to separate large solid particles from the drilling fluid. The shale shaker is generally positioned directly above the mud storage tank. The rest of the equipment for solids handling including a settling tank, a shale bin for collecting solids for disposal, centrifuges and a flocculent tank tends to be available as individual pieces of equipment that must be delivered to the well site in separate loads. It is important to choose compatible equipment that is interconnectable and that is properly sized to be of appropriate capacity to work with other selected equipment. Once delivered to the site, the various pieces of equipment must be assembled together. Generally, a picker truck is needed to lift the centrifuge equipment onto a conventional raised centrifuge stand. It requires superior organization and scheduling skills to ensure the components of a solids handling system are delivered in a timely manner to the work site and assembled into an efficient and reliable solids handling system.

SUMMARY OF THE INVENTION

There is a need for a solids handling system for drilling fluid at a well site that avoids the logistical and assembly problems of the prior art.

The present invention provides a self-contained apparatus for cleaning drilling fluids that is mountable on a platform for convenient transport by a conventional truck trailer between well sites as a single load. The components of the apparatus are sized and positioned to operate together in an efficient manner under various working configurations in which some or all of the components are used depending on the stage of the well being drilled.

Accordingly, the present invention provides a transportable drilling fluid cleaning system for removing solids from drilling fluid at a drill site comprising:

a platform for transporting the cleaning system to a drill site;

a bin region on the platform to retain solids from the drilling fluid;

a settling tank on the platform having an inlet chamber to receive drilling fluid and at least one other chamber, the settling tank acting to separate the drilling fluids into an upper fluid fraction having a reduced concentration of solids and a lower solids fraction having a higher concentration of solids as the drilling fluid flows from the inlet chamber to at least one other chamber; and a stand on the platform to support at least one centrifuge for separating the solids from the drilling fluid, the stand being movable between a stored position during transport of the platform and an operating position.

The platform is preferably in the form of a skid sized to be readily transportable on a conventional truck semi-trailer. The maximum dimensions for a loaded trailer in the province of Alberta, Canada to permit navigation on roads and highways are a length of about 63 feet, a width of about 12.5 feet and a height of about 17.5 feet. The components of the present invention are sized to take maximum advantage of these dimensions.

In a further aspect, the present invention provides apparatus for removing solids from a fluid/solid mixture comprising, in combination:

a platform;

a region defined on the platform to retain solids;

a settling tank on the platform having at least an inlet chamber for receiving the mixture and an outlet chamber, the settling tank acting to separate the mixture into an upper fluid fraction and a lower solids fraction as the mixture flows from the inlet chamber to the outlet chamber; and at least one centrifuge on the platform in fluid communication with the settling tank and movable between a stored position and an operating position.

In a preferred arrangement, a flocculent source is also provided on the platform for adding a flocculating agent to the drilling fluid to promote removal of solids from the drilling fluid.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
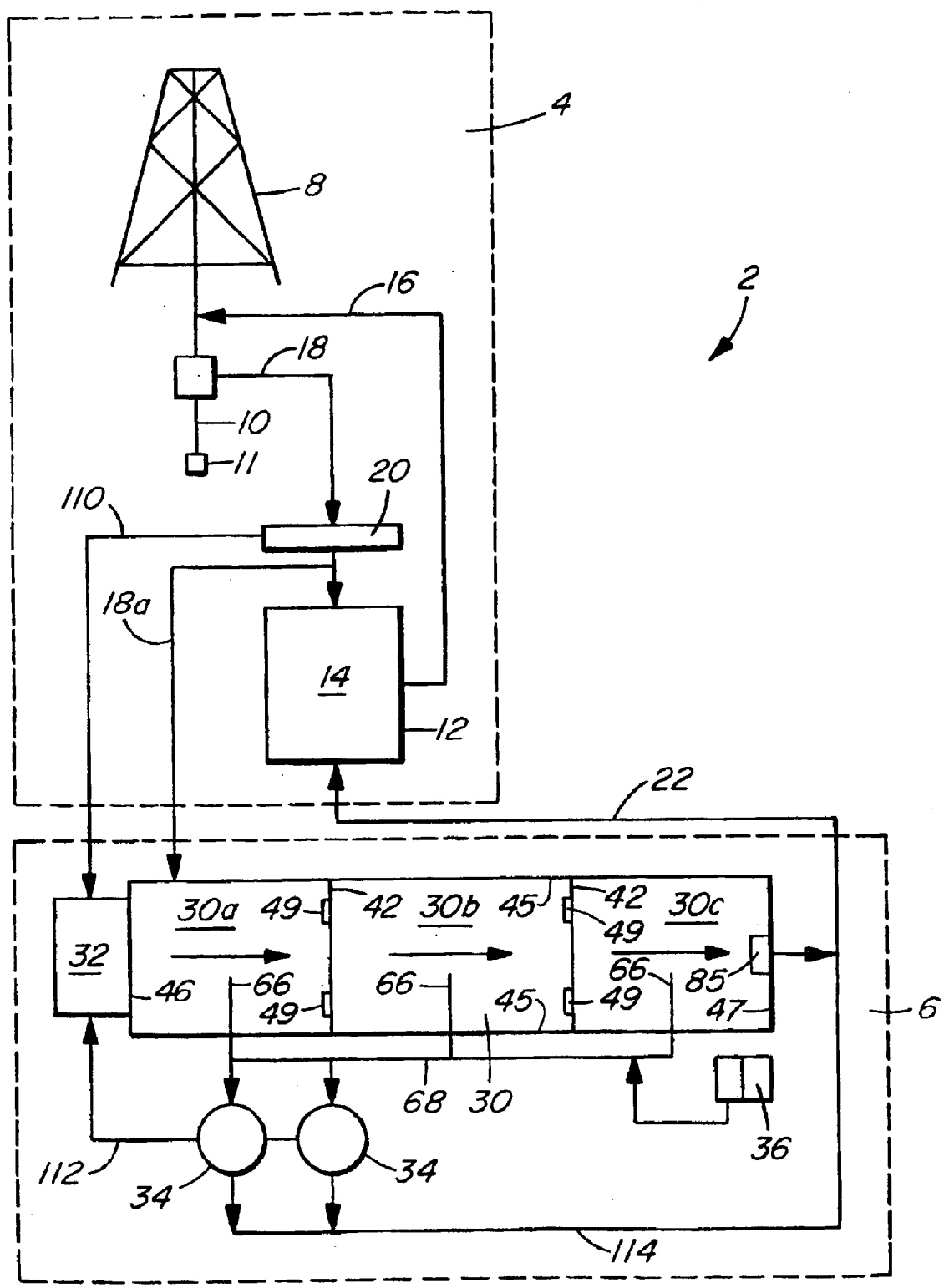
FIG. 1 is a schematic view of a drilling system incorporating the transportable drilling fluid cleaning system of the present invention.

Referring to FIG. 1, there is shown a schematic view of a well drilling system 2 which includes a drill rig 4 and a transportable drilling fluid cleaning system 6 according to the present invention. Drill rig 4 includes a drill derrick 8 supporting a drill string 10 which is rotated to drill a well bore into the ground. A tank 12 associated with drill rig 4 stores drilling fluid 14. The viscosity of drilling fluid 14 can be adjusted depending on the stage to which the well bore is drilled. The apparatus of the present invention can be used to remove undesired solids from the drilling mud and to recycle the drilling fluid to tank 12 at a desired viscosity.

Drilling fluid 14 is pumped in a conventional manner through conduit 16 into drill string 10. Fluid 14 flows downwardly through the drill string to exit from the lower end of the string at bit 11. Drilling fluid 14 acts to lubricate the drill bit and collect cuttings created by the drilling action of the bit. The drilling fluid with additional solids flows upwardly in the well bore externally to the drill string to be collected near the surface. The collected drilling fluid/solids mixture passes through conduit 18 to be delivered to shale shaker 20. Shale shaker 20 is a vibrating screen positioned above tank 12 that removes solids from the drilling fluid and delivers cleaned drilling fluid back to tank 12. Depending on the stage of drilling and the volume of drilling fluid being used, shaker 20 may be able to remove solids to an extent such that the drilling fluid simply drains through the shaker directly into tank 12 for re-use. In other cases, some or all of the drilling fluid that passes through shaker 20 is diverted via conduit 18a for delivery to the drilling fluid cleaning apparatus 6 of the present invention. Apparatus 6 removes solids from the drilling fluid 14 by settling, centrifuging or a combination of methods to deliver cleaned drilling fluid back to tank 12 via conduit 22.

Figure 2:
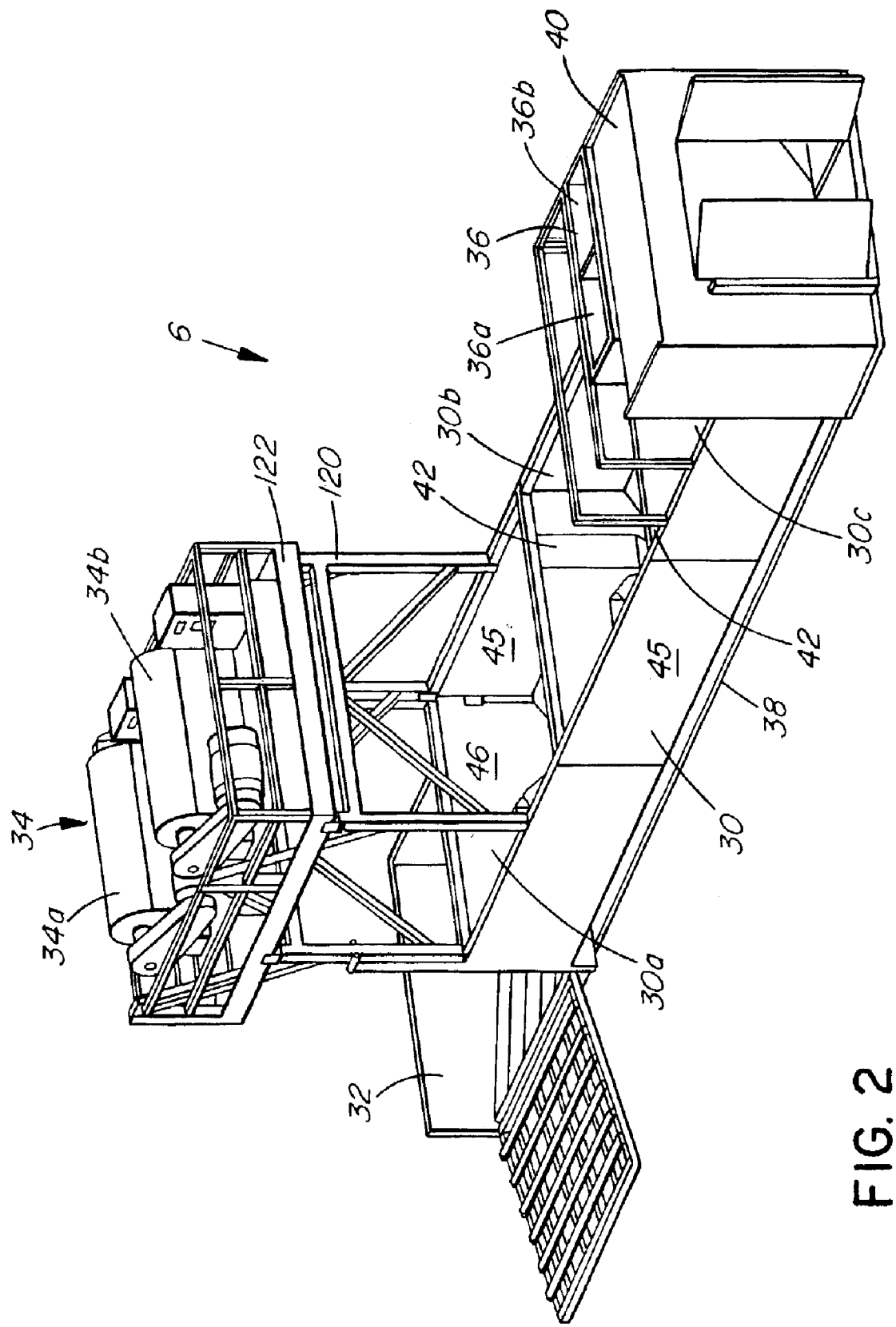
FIG. 2 is a perspective view of a preferred embodiment of the transportable drilling fluid cleaning system.

FIG. 2 shows a perspective view of a preferred embodiment of the transportable drilling fluid cleaning apparatus 6 of the present invention. The system includes a settling tank 30, a bin 32 to retain solids extracted from the drilling fluid, at least one centrifuge 34, and, optionally, a flocculent source 36. The above components are arranged on a platform, preferably in the form of a skid 38, to permit loading of the system onto a trailer towable by a truck for transport of all the components as a unit in a single trip by road between drilling sites. In the province of Alberta, Canada, where the inventors are based, skid 38 can be dimensioned to a maximum size of 63 feet long, 12.5 feet wide and 17.5 feet high in order to be transportable on roads and highways as a non-divisible load. A skid of this size requires a special permit for oil field hauling, however, a pilot vehicle to lead or follow the truck is not required. Skids of different sizes may be permitted in other jurisdictions.

Figure 3:
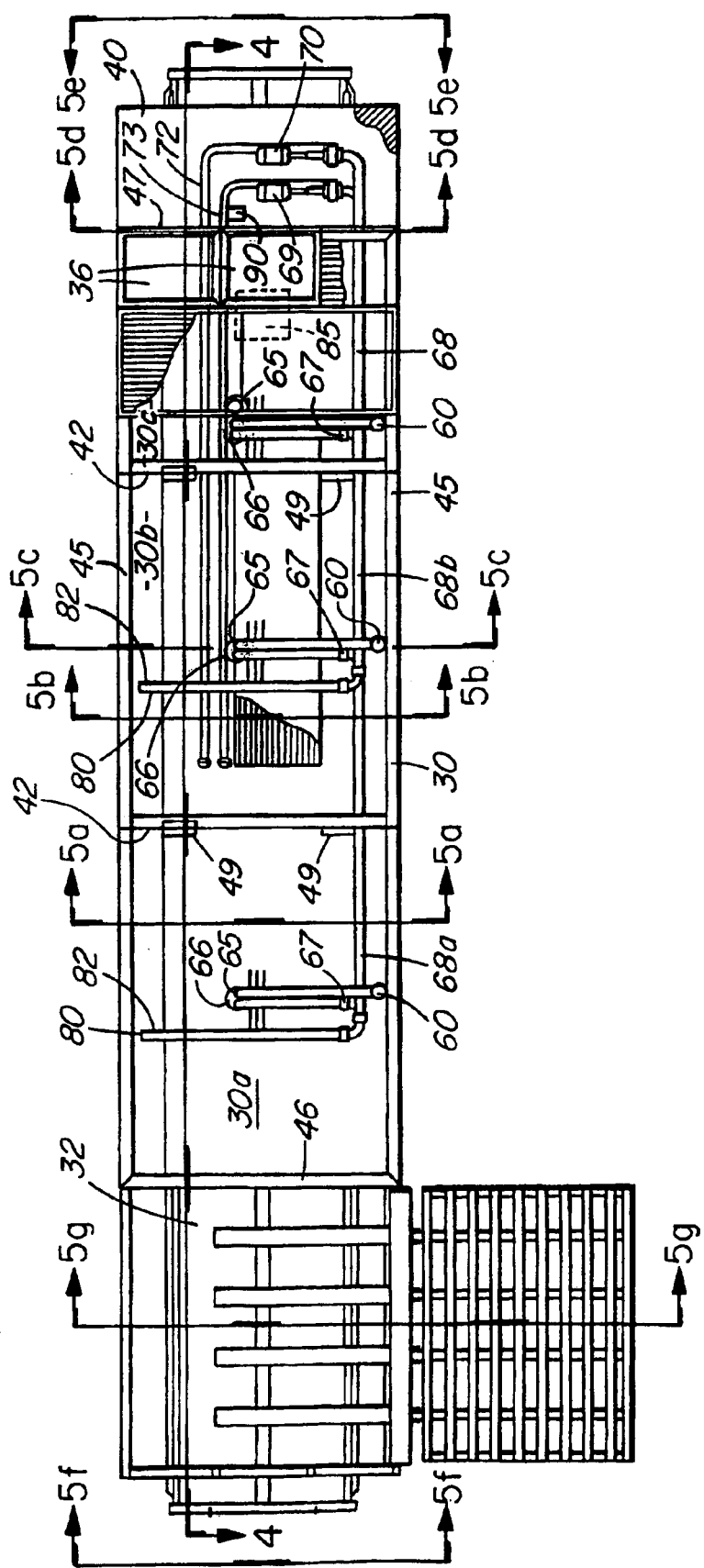
FIG. 3 is a top plan view of the cleaning system of FIG. 2.

FIG. 3 is a plan view of apparatus 6 with the centrifuges removed showing details primarily of settling tank 30. Settling tank 30 occupies the largest area on skid 38 extending over most of the length of the skid from bin 32 to an enclosure 40 housing at least one pump that acts to move drilling fluid from the settling tanks to the centrifuges of the apparatus. Settling tank 30 is divided into an inlet chamber 30a and at least one other chamber by baffle walls 42 that extend transversely between tank side walls 45 at intervals between end walls 46 and 47. In the illustrated embodiment, settling tank 30 is formed with three chambers: an inlet chamber 30a, an intermediate chamber 30b, and an end chamber 30c. Depending on the size of skid 38 and the solids content of the drilling fluid, additional or fewer chambers can be formed as will be apparent to a person skilled in the art. The chambers of the settling tank can be formed to be substantially equal in volume. If chambers of differing size are used, inlet chamber 30a may be the largest chamber as it experiences the largest solids load. By way of example, it is possible to construct a settling tank having a volume ranging between about 1050 to about 2100 cubic feet on a skid that is dimensioned to be transportable on roads by truck trailer. Such a tank can be divided into three equal chambers of about 350 to 700 cubic feet. The overall dimensions of such a settling tank are 40 feet long and 11.5 feet wide with the height being varied between about 2.5 feet and about 5 feet to accommodate the range of tank volumes.

Figure 4:
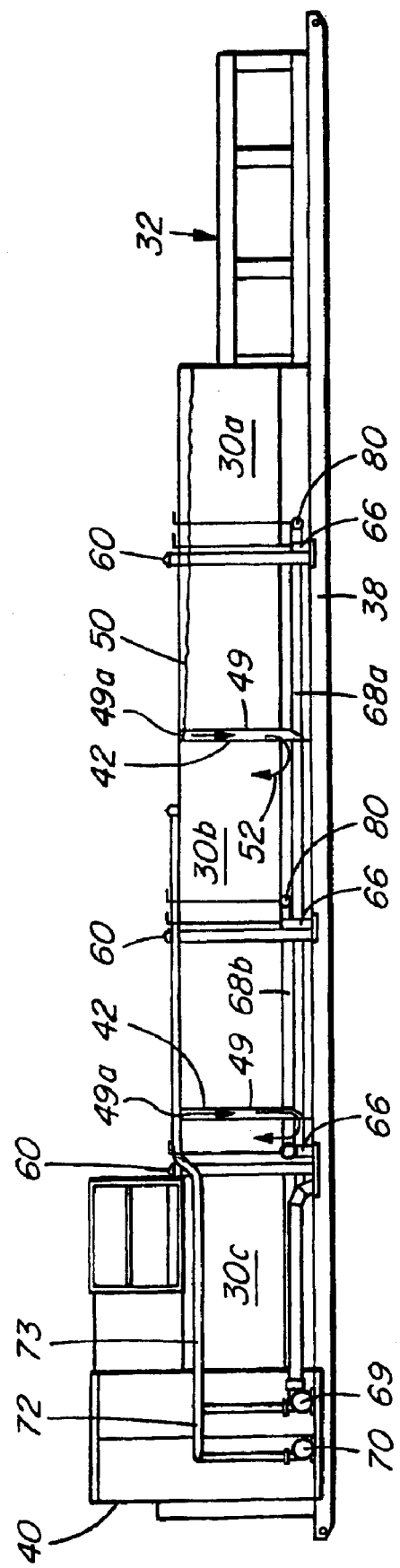
FIG. 4 is a longitudinal section view taken along line 4—4 of FIG. 3.

Inlet chamber 30a receives drilling fluid via conduit 18a as best shown in FIG. 1. Conduit 18a can be a large diameter hose from mud storage tank 12 through which drilling fluid 14 is pumped. As drilling fluid flows from inlet chamber 30a through the various additional chambers, settling tank 30 acting to separate the drilling fluid into an upper fluid fraction having a reduced concentration of solids and a lower solids fraction having a higher concentration of solids. Each baffle 42 is formed with at least one passage 49 formed thereon adapted to deliver drilling fluid that overflows into the passage from a first upstream chamber to adjacent a floor of a second downstream chamber. For example, as best shown in FIG. 4, which is a longitudinal section view taken along line 4—4 of FIG. 3, drilling fluid which fills chamber 30a to level 50 overflows into passage 49 adjacent baffle 42 and flows in the direction indicated by arrow 52 to emerge at the bottom of chamber 30b. Baffles 42 and passages 49 serve to slow the flow of drilling fluid through the chambers of settling tank 30 to allow solids in the drilling fluid time to settle due to gravity and concentrate toward the bottom of each chamber. Therefore, the drilling fluid at the top of each chamber tends to have a lower solids concentration, and it is this fluid that overflows to the next chamber with the result that the drilling fluid has less solids as it travels to downstream chambers. Inlet chamber 30a tends to have the greatest solids load while subsequent chambers see increasingly smaller loads.

As best shown in FIGS. 3 and 4, it is preferable that each baffle 42 includes two spaced, vertically aligned passages 49 although other arrangements are possible depending on the volume of fluid to be treated and the desired residence time in each chamber. Preferably, each passage 49 includes a cover 49a which is pivotable to seal or open the passage to control flow therethrough. Passages 49 are also shown in section view 5a taken along line 5a—5a of FIG. 3.

Referring to FIG. 3, each chamber of the settling tank includes a collection area or sump 65 in the floor of the chamber in which the lower solids fraction of the drilling fluid tends to concentrate. As best shown in FIGS. 5a–5e, the lower portion 45a of tank side walls 45 are preferably angled inwardly to direct settling solids to sump 65. Sump 65 provides a convenient location into which various conduits extend for collection of drilling fluid for further processing.

Figure 5A:
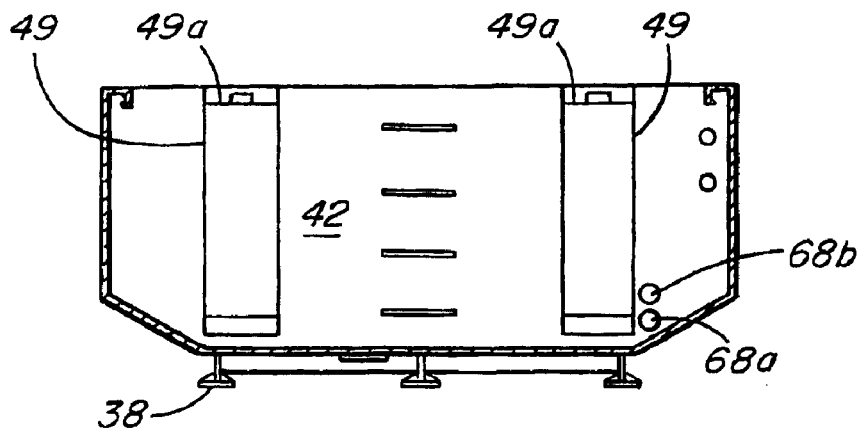
FIGS. 5a–5g are section views taken along the indicated section lines of FIG. 3 showing various details of the cleaning system.
Figure 5B:
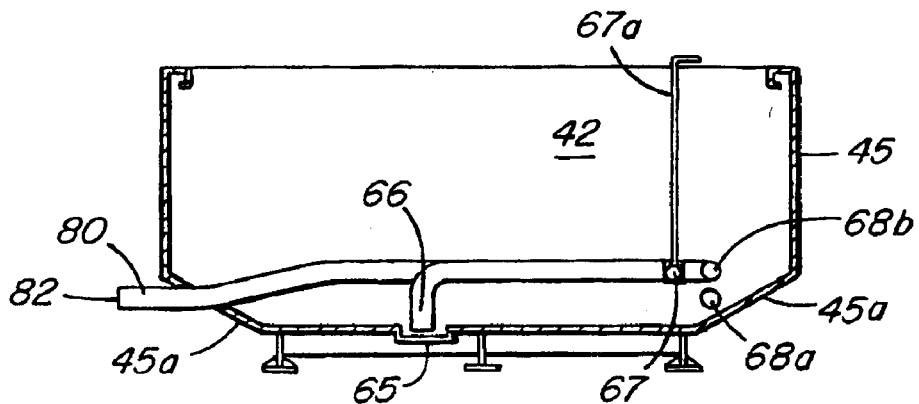

Adjacent each sump 65, there is an inlet 66 to a collection conduit 68 that preferably runs along a side wall 45 of the settling tank. FIG. 5b, which is a section taken along line 5b—5b of FIG. 3, shows in detail inlet 66 extending from sump 65 to collection conduit 68. Each inlet 66 includes a manually operable valve 67 to open or close the inlet. Valve 67 can be operated from above the settling tank by control 67a extending upwardly from the valve. FIG. 3 shows collection conduit 68 extending through baffles 42 to communicate sump 65 of each chamber with at least one pump located in pump enclosure 40 at the end of the skid. In the illustrated embodiment, enclosure 40 houses first and second pumps 69, 70, respectively, which act to collect the lower solids fraction of the drilling fluids from the chambers and deliver the fluid to the centrifuges for further solids separation. Drilling fluid is pumped to the centrifuges via lines 72,73 which extend generally along the longitudinal axis of skid 38 above settling tank 30 back to the platform that supports the centrifuges over inlet chamber 30a. Depending on the volume of drilling fluid to be handled only a single pump and/or centrifuge may be necessary.

Collection conduit 68 is preferably formed from two pipelines: a first pipeline 68a communicates inlet chamber 30a to first pump 69 and a second pipeline 68b communicates the remaining chambers 30b and 30c with second pump 70. As best shown in the section views of FIGS. 5a to 5e, pipelines 68a and 68b are preferably stacked vertically as they extend along the settling tank to pumps 69, 70. Pipeline 68a and pump 69 service only inlet chamber 30a as this chamber experiences the greatest solids loads and will tend to require a dedicated centrifuge at the end of line 73. In contrast, intermediate chamber 30b and end chamber 30c, downstream from inlet chamber 30a, are subjected to progressively lesser solids loads since they are processing drilling fluid that has already had solids removed. Therefore, these subsequent chambers are adequately serviced by second pipeline 68b and pump 70 which feed the combined flows from chambers 30b and 30c to a second centrifuge via line 72.

Referring to FIG. 3 and FIG. 5b, depending on the solids load of the drilling fluid, some or all of the chambers of settling tank 30 may not be required. To accommodate this situation, at least one chamber of the settling tank preferably includes a bypass conduit 80 having an inlet 82 external to the tank that communicates with collection conduit 68a or 68b. Drilling fluid 14 from mud tank 12 would be pumped via a hose directly into a bypass conduit 80 to bypass the chamber and feed directly into the conduit 68 for delivering to the centrifuges. In the illustrated embodiment, inlet chamber 30a and intermediate chamber 30b are provided with bypass conduits 80.

Figure 5C:
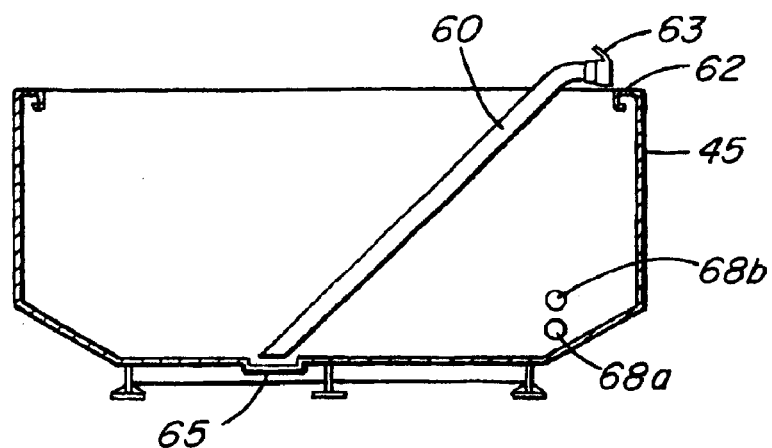

Referring to FIG. 3 and FIG. 5c, it is preferable that each chamber 30a, 30b and 30c of the settling tank include a drainage conduit 60 to permit drainage of drilling fluid from the chamber. FIG. 5c which is a section view taken along line 5c—5c of FIG. 3 shows a typical drainage conduit 60 which extends from the floor of the chamber adjacent sump 65 to the top edge 62 of side wall 45 of the settling tank. Each drain conduit 60 includes a terminal coupling 63 with a manually operable valve by which the conduit can be connected to a hose for withdrawing drilling fluid from the chamber. Drain conduits 60 are typically used to drain the chambers of the settling tank prior to moving the system of the present invention to a new drilling site.

Figure 5D:
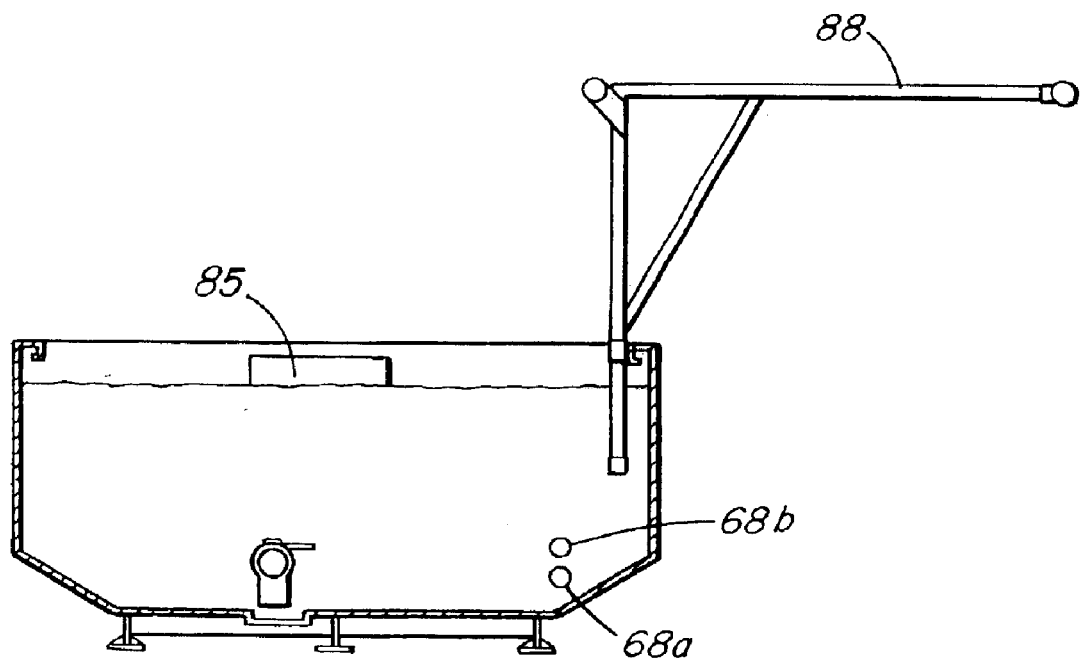

Drilling fluid that is cleaned within settling tank 30 needs to be pumped back to mud tank 12 via conduit 22 (FIG. 1) to complete one possible path of the solids removal cycle of the present invention. This pumping action is performed by at least one pump in the settling chamber. Preferably, the pump comprises a floating pump 85 situated in end chamber 30c as best shown in FIG. 5d which is a cross-section taken along line 5d—5d in FIG. 3. FIG. 5d also shows a pivoting boom structure 88 by which floating pump 85 can be lifted into and out of end chamber 30c.

Figure 5E:
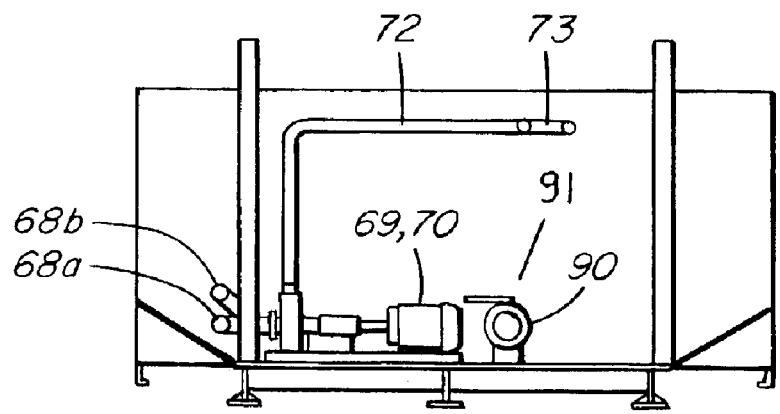

Depending on the volume of drilling fluid that requires recycling generated at a well site, it may be necessary to use more than one system according to the present invention. It is possible to connect together multiple cleaning systems according to the present invention in modular fashion to increase the drilling fluid handling capacity. At least one chamber of the settling tank other than inlet chamber 30a includes an outlet conduit 90 to permit connection in series to an additional drilling fluid cleaning system. Referring to FIG. 3 and FIG. 5e, which is an end section taken along line 5e—5e of FIG. 3, outlet conduit 90 preferably extends from end chamber 30c and is housed within pump enclosure 40. Outlet conduit 90 includes a valve assembly 91 to control flow of fluid through an attached hose which feeds directly into the inlet chamber of an additional adjacent drilling fluid cleaning system according to the present invention.

Drilling fluid pumped by pumps 69 and 70 is directed to centrifuges for further solids separation. Referring to FIG. 2, the illustrated embodiment employs two centrifuges 34a and 34b which are conventional units. As previously mentioned, depending on the volume of drilling fluids to be processed and the solids content of the drilling fluid, only a single centrifuge may be necessary. Centrifuges 34a and 34b are supported on a stand 120 that is movable between a stored position during transport of the cleaning system and an operating position when the system is working at a well site. Centrifuges 34a and 34b are sized to match the capacity of the pump delivering drilling fluid via conduits 72 and 73. For example, if pump 69, which pumps drilling fluid from inlet chamber 30a is rated for 1000 litres/minute, centrifuge 34a to which the fluid is delivered should be able to handle this volume. Pump 70 delivers drilling fluid from the other chambers 30b and 30c to centrifuge 34b. The cleaned drilling fluid from the centrifuges is preferably fed back into mud storage tank 12 via line 114 as best shown in FIG. 1. Alternatively, the cleaned fluid from the centrifuges can be directed back into inlet chamber 30a to reduce the solids loading on the inlet chamber.

Stand 120 that supports centrifuges 34a and 34b includes an elevatable surface 122 mounted to an elevating system for the surface between the operating position in which the surface is raised above the settling tank and the stored position in which the surface is lowered adjacent the settling tank to reduce the overall height of the unit so that the apparatus is sufficiently compact for transportation by semi-trailer on roads or highways. The elevating system for surface 122 can be constructed according to various different arrangements. Some specific preferred arrangements are described below, however, the system of the present invention is not limited to these specific arrangements.

Figure 6A:
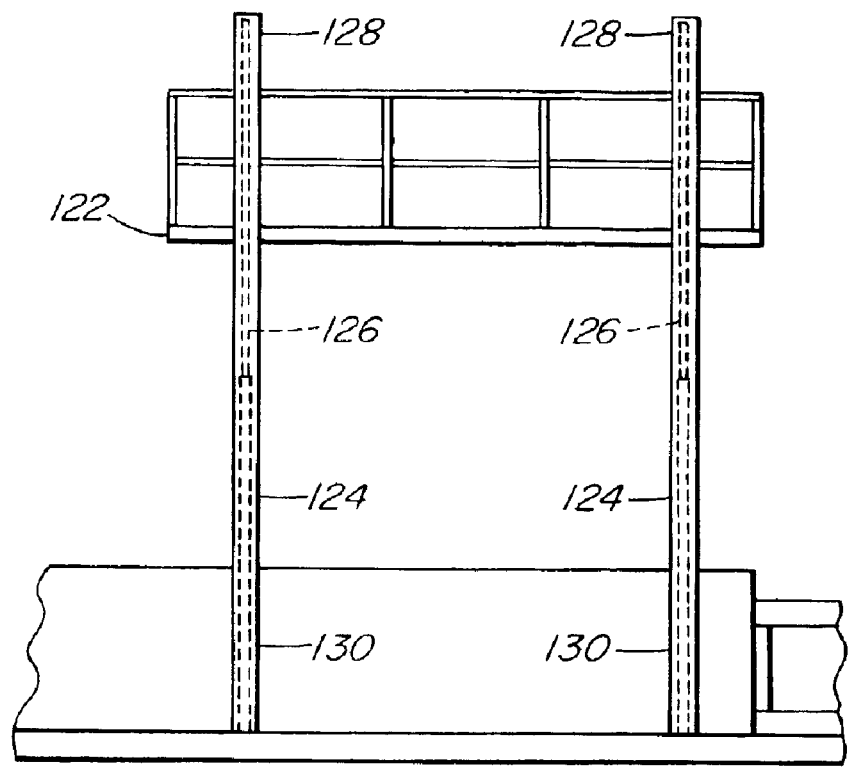
FIGS. 6a–8c are detail views of various elevatable platforms for supporting the centrifuge according to the present invention.
Figure 6B:
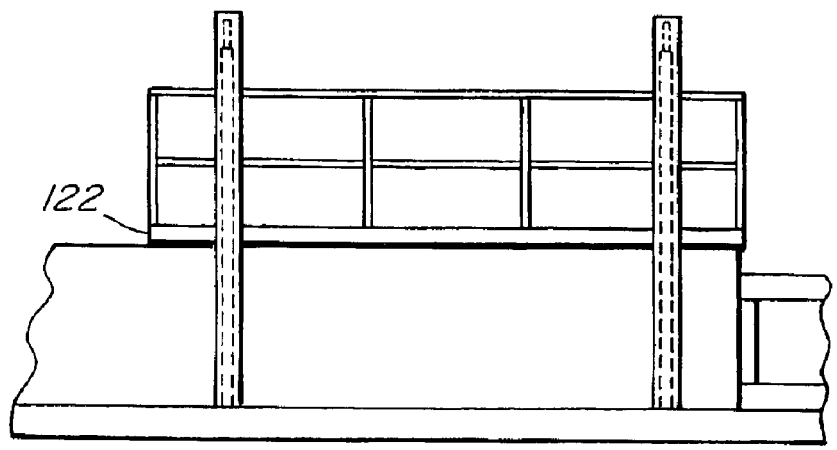

FIGS. 6a and 6b show the operation of a centrifuge stand 120 having an elevating system that relies on a plurality of telescoping legs 124. Four legs 124 extend between the side walls 45 of settling tank 30 and the corners of elevatable surface 122. Each leg includes an internal hydraulic cylinder 126 that is extendable to move an upper leg portion 128 to which surface 122 is mounted upwardly with respect to a lower fixed leg portion 130 as shown in FIG. 6a. When cylinder 126 is collapsed, surface 122 is moved downwardly to the stored position as shown in FIG. 6b.

Figure 7C:
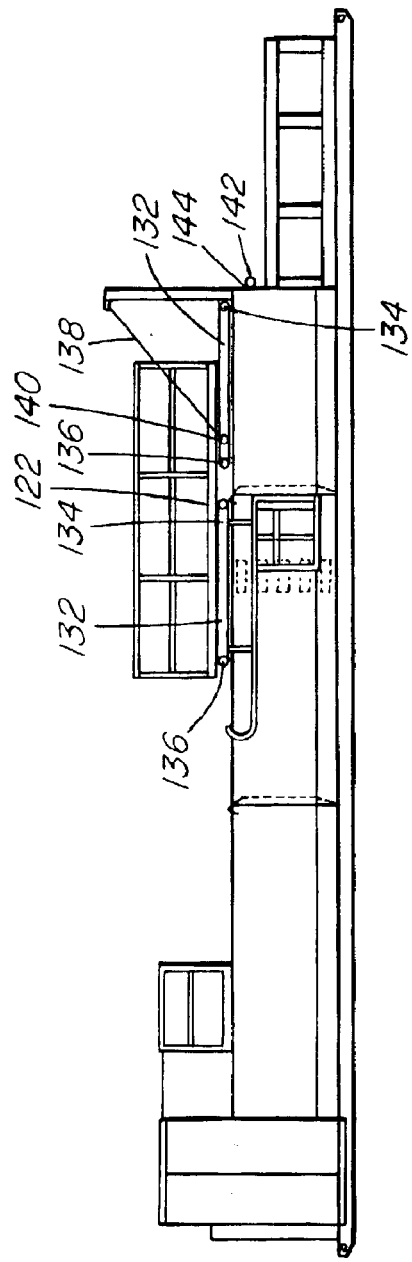

FIGS. 7a to 7c illustrate an alternative arrangement in which the elevating system comprises a plurality of pivotable legs 132 pivotable by an actuating system between a generally horizontal alignment corresponding to surface 122 being in the lowered, stored position (FIG. 7c) and a generally vertical alignment corresponding to the surface being in the raised operating position (FIG. 7a). FIG. 7b shows an intermediate position to clearly show the operation of the elevating system. Preferably, surface 122 supporting the centrifuges is supported by four pivotable legs 132 at the corners of the surface. Each pivotable leg 132 is pivotally connected to the settling tank at a lower end 134 and pivotally connected to the surface at an upper end 136. Pivoting of the legs is controlled by an actuating system comprises at least one cable 138 of variable length. A first end 140 of cable 138 is attached to at least one of the legs. Preferably, the cable is attached to two of the legs supporting surface 122. Cable 140 is extendable to allow legs 132 to pivot to their generally horizontal alignment (FIG. 7c) and retractable to pull the legs to their generally vertical alignment (FIG. 7a).

Cable 140 is attached to a piston arm of a cylinder 142 at a second end 144 of the cable, and the cable extends and retracts by virtue of extending and retracting of the piston arm. Preferably, cylinder 142 is mounted externally to the end wall 46 of settling tank 30 in a horizontal orientation. Movement of cable 140 is guided by appropriately placed sheaves along the cable path.

Figure 8A:
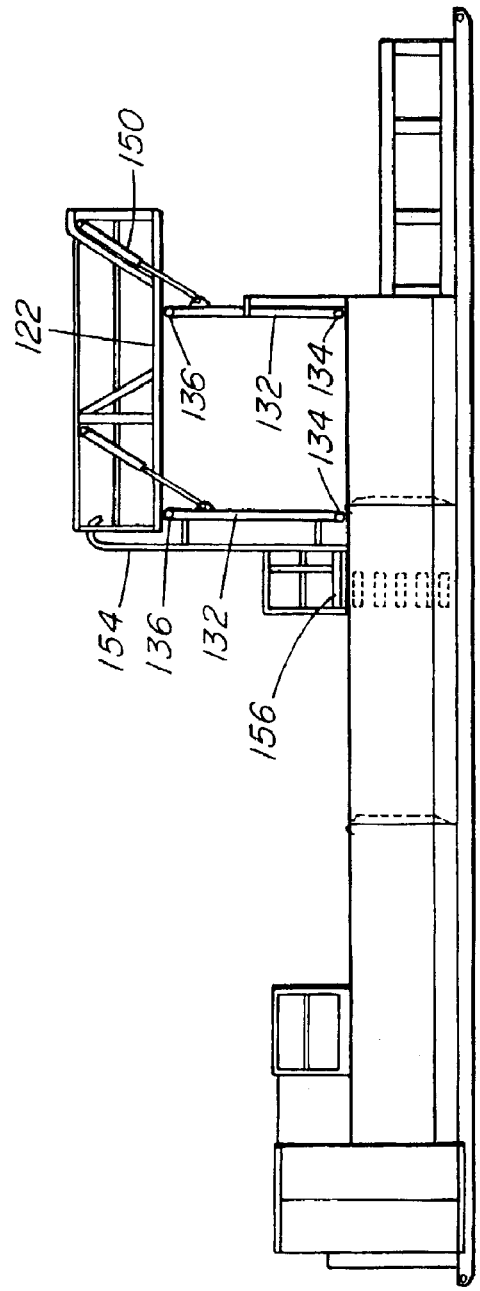

FIGS. 8a to 8c illustrate a still further elevating system that is similar to the elevating system of FIGS. 7a to 7c in that the arrangement relies on pivotable legs 132 that are pivotally connected to the settling tank at a lower end 134 and pivotally connected to surface 122 at an upper end 136. The cable actuating system is replaced by at least one telescoping cylinder 150 pivotally connected at each end of the cylinder to surface 122 and at least one of the pivotable legs 132. The telescoping cylinder is extendable and retractable to control the angle between surface 122 and the at least one pivotable leg in order to raise (FIG. 8a) and lower the surface (FIG. 8c). Preferably, there are at least two telescoping cylinders 150 associated with two pivotable legs.

As shown in FIG. 8a, it is preferably that an access ladder 154 and walkway 156 are mounted to at least one of the pivotable legs 132 to permit access to the centrifuge stand when it is in the raised, operating position. Ladder 154 and walkway 156 are mounted to legs 132 such that the ladder and walkway are positioned within the settling tank when the legs are pivoted to the generally horizontal alignment shown in FIG. 8c.

In certain circumstances during drilling, it may be desirable to use a flocculating agent to promote the removal of solids from the drilling fluid. To address this need, the system of the present invention may include a flocculent source for adding a flocculating agent to the drilling fluid. Preferably, the flocculent source comprises at least one compartment 36 for holding and mixing a flocculating agent and a delivery system to deliver flocculating agent to the centrifuges and/or the settling tank. Preferably, flocculating agent is added to the drilling fluid at the inlets of pumps 69 and 70 so the agent is mixed with the drilling fluid prior to centrifuging. Alternatively, flocculating agent can be added to one or more chambers of the settling tank.

As best shown in FIGS. 2 and 3, the flocculent source preferably comprises two compartments 36a, 36b for holding and mixing flocculating agent. In the illustrated example, compartments 36a, 36b both deliver flocculating agent to the inlet of pumps 69, 70. Alternatively, first compartment 36a may deliver flocculating agent to the inlets of pumps 69 and 70 while second compartment 36b may deliver flocculating agent to the inlet chamber of the settling tank. Compartments 36a, 36b are preferably positioned above the settling tank over end chamber 30c.

Figure 5F:
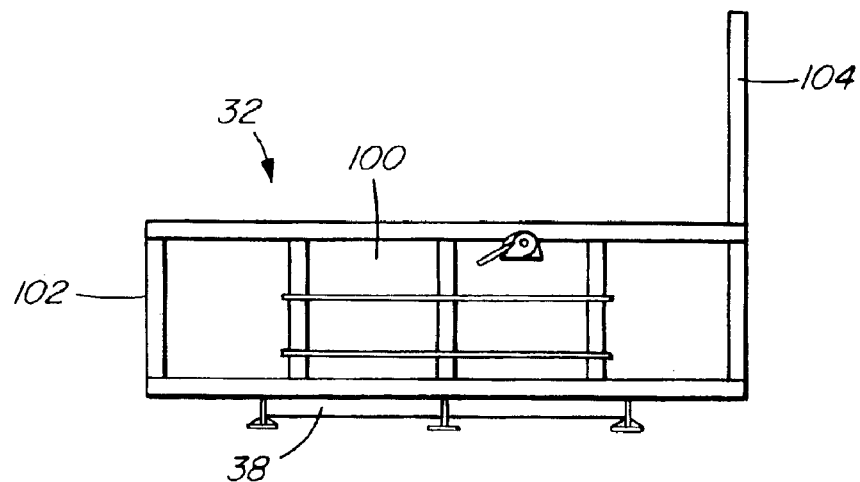
Figure 5G:
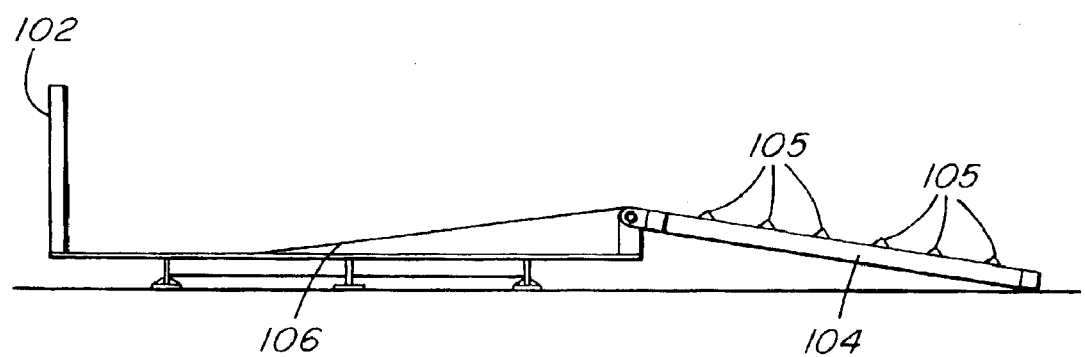

Solids removed from the drilling fluid by centrifuges 34a and 34b and solids from shale shaker 20 are preferably stored in a bin 32 adjacent the same end of skid 38 as the centrifuges. Collection pipes 68a and 68b within the settling tanks tend to collect all the settled solids from chambers 30a, 30b and 30c for delivery to pumps 69, 70 and the centrifuges. Bin 32 is defined by four walls and a floor at a region of the skid adjacent inlet chamber 30a and centrifuges 34a, 34b. FIG. 5f is an end view of skid 38 taken along line 5f—5f of FIG. 3 showing an end wall 100 of bin 32. The opposite end wall of the bin is wall 46 shared with inlet chamber 30a. Side wall 102 of bin 32 is fixed while the opposite side wall 104 is pivotally mounted to move between a first raised position to retain solids dumped into the bin (FIG. 5f) and a second, lowered position to define a ramp for access to the bin for periodic removal of solids (FIG. 5g). When wall 104 is in its lowered position as a ramp, a front end loader or other suitable equipment can be driven up the ramp to permit efficient access to the bin interior. Preferably, wall 104 is formed with transverse ridges 105 that act as traction bars for vehicles entering the bin when in the lowered position. Preferably, the floor 106 of bin 32 is sloped away from pivotally mounted wall 104 to ensure that solids tend to collect away from the pivoting connection of wall 104.

In use, the drilling fluid cleaning system of the present invention is operated according to different schemes depending on the drilling stage.

During drilling of the "surface hole" (the first portion of the borehole), relatively high viscosity drilling fluid is used to protect groundwater aquifers. During drilling of the surface hole, only the shale bin of the system is typically used. This involves sending solids retained on the shale shaker to the shale bin as indicated by arrow 110 on FIG. 1.

During drilling of the "floc-water section" (the middle portion of the borehole), relatively low viscosity drilling fluid is used in order to maximize the rate of penetration. During drilling of the floc-water section, all of the components of the system are typically used. This involves sending solids from the shale shaker to the shale bin 32, and also circulating drilling fluid from mud storage tank 12 to settling tank 30, and centrifuges 34, and then back to the mud storage tank. Solids from the centrifuges 34 are also sent to the shale bin as indicated by arrow 112 in FIG. 1.

During drilling of the "mud-main hole" (the bottom portion of the borehole), the producing formation is penetrated and the viscosity and weight of the drilling fluid must be carefully monitored. During the drilling of the main hole, only the centrifuges 34 and the shale bin 32 of the system are typically used. This involves sending drilling fluid from mud storage tank 12 directly to the centrifuges 34 for treatment using bypass conduits 80, and then returning the treated drilling fluid to the mud storage tank as shown by arrow 114 in FIG. 1. Solids collected on the shale shaker and solids from the centrifuges are sent to shale bin 32.

While the apparatus of the present invention has been described in an environment in a well drilling environment, it is contemplated that the apparatus can be used in any situation where there is a requirement for high volume removal of solids from a fluid/solid mixture in order to recycle the fluid portion.

Although the present invention has been described in some detail by way of example for purposes of clarity and understanding, it will be apparent that certain changes and modifications may be practised within the scope of the appended claims.

What is claimed is:

1. A transportable drilling fluid cleaning system for removing solids from drilling fluid at a drill site comprising:
    a platform for transporting the cleaning system to a drill site;
    a bin region on the platform to retain solids from the drilling fluid;
    a settling tank on the platform having an inlet chamber to receive drilling fluid and at least one other chamber, the settling tank acting to separate the drilling fluids into an upper fluid fraction having a reduced concentration of solids and a lower solids fraction having a higher concentration of solids as the drilling fluid flows from the inlet chamber to at least one other chamber; and
    a stand on the platform to support at least one centrifuge for separating the solids from the drilling fluid, the stand being movable between a stored position during transport of the platform and an operating position.

2. A drilling fluid cleaning system as claimed in claim 1 in which the platform for transporting comprises a skid loadable onto a trailer towable by a vehicle to move the system as a unit.

3. A drilling fluid cleaning system as claimed in claim 1 in which the settling tank includes at least one intermediate chamber between the inlet chamber and an end chamber.

4. A drilling fluid cleaning system as claimed in claim 3 in which the inlet, intermediate and end chambers are separated from each other by a baffle extending across the settling tank.

5. A drilling fluid cleaning system as claimed in claim 4 including at least one passage formed on each baffle adapted to deliver fluid that overflows from a first upstream chamber into the passage to adjacent a floor of a second downstream chamber.

6. A drilling fluid cleaning system as claimed in claim 5 in which the at least one passage includes a cover positionable to seal the passage.

7. A drilling fluid cleaning system as claimed in claim 5 including two, spaced vertically aligned passages at each baffle.

8. A drilling fluid cleaning system as claimed in claim 1 in which each chamber of the settling tank includes a drainage conduit to permit drainage of the chamber.

9. A drilling fluid cleaning system as claimed in claim 1 including at least one pump to pump drilling fluid from the settling tank to the at least one centrifuge.

10. A drilling fluid cleaning system as claimed in claim 9 in which each chamber of the settling tank communicates with the at least one pump via a collection conduit having an inlet to collect the lower solids fraction of the drilling fluids.

11. A drilling fluid cleaning system as claimed in claim 10 in which each chamber of the settling tank includes a collection area in a floor of the chamber in which the lower solids fraction of the drilling fluid tends to concentrate and into which the inlet of the collection conduit extends.

12. A drilling fluid cleaning system as claimed in claim 10 in which at least one chamber of the settling tank also includes a bypass conduit having an inlet external to the tank that communicates with the collection conduit.

13. A drilling fluid cleaning system as claimed in claim 10 in which two pumps communicate with the settling tank chambers via a plurality of collection conduits with a first pump communicating with the inlet chamber and a second pump communicating with the other chambers.

14. A drilling fluid cleaning system as claimed in claim 13 in which the settling tank includes intermediate chambers between the inlet chamber and an end chamber and the second pump communicates with the end chamber and any intermediate chambers.

15. A drilling fluid cleaning system as claimed in claim 1 including at least one pump to pump drilling fluid from the settling tank to a source of drilling fluid.

16. A drilling fluid cleaning system as claimed in claim 15 in which the at least one pump is a floating pump in the at least one other chamber of the settling tank.

17. A drilling fluid cleaning system as claimed in claim 1 in which the at least one other chamber includes an outlet conduit to permit connection in series to an additional drilling fluid cleaning system via the inlet chamber of said additional cleaning system.

18. A drilling fluid cleaning system as claimed in claim 1 in which the chambers of the settling tank are substantially equal in volume.

19. A drilling fluid cleaning system as claimed in claim 1 in which the inlet chamber of the settling tank is the largest chamber.

20. A drilling fluid cleaning system as claimed in claim 1 in which the bin region is defined by four walls and a floor with one of the walls being pivotally mounted to move between a first raised position to retain solids and a second, lowered position to define a ramp for access to the bin region for removal of solids.

21. A drilling fluid cleaning system as claimed in claim 20 in which the floor of the bin region is sloped away from the pivotally mounted wall.

22. A drilling fluid cleaning system as claimed in claim 1 in which the bin region is located at an end of the platform adjacent the inlet chamber of the settling tank.

23. A drilling fluid cleaning system as claimed in claim 1 including a flocculent source on the platform for adding a flocculating agent to the drilling fluid to promote removal of solids from the drilling fluid.

24. A drilling fluid cleaning system as claimed in claim 23 in which the flocculent source comprises at least one compartment for holding and mixing a flocculating agent and a delivery system to deliver flocculating agent to the at least one centrifuge.

25. A drilling fluid cleaning system as claimed in claim 24 in which the delivery system also delivers flocculating agent to the settling tank.

26. A drilling fluid cleaning system as claimed in claim 24 in which the flocculent source includes two compartments for holding and mixing flocculating agent in which a first compartment delivers flocculating agent to the at least one centrifuges and a second compartment delivers flocculating agent to the settling tank.

27. A drilling fluid cleaning system as claimed in claim 23 in which the flocculent source is positioned above the settling tank.

28. A drilling fluid cleaning system as claimed in claim 1 in which the stand to support the at least one centrifuge comprises:
    an elevatable surface;
    an elevating system for moving the surface between the operating position in which the surface is raised above the settling tank and the stored position in which the surface is lowered adjacent the settling tank.

29. A drilling fluid cleaning system as claimed in claim 28 in which the surface is positioned above the inlet chamber of the settling tank.

30. A drilling fluid cleaning system as claimed in claim 28 in which the elevating system comprises a plurality of telescoping legs that are extendable to raise the surface to the operating position and retractable to lower the surface to the stored position.

31. A drilling fluid cleaning system as claimed in claim 28 in which the elevating system comprises a plurality of pivotable legs pivotable by an actuating system between a generally horizontal alignment corresponding to the surface being in the lowered stored position and a generally vertical alignment corresponding to the surface being in the raised operating position.

32. A drilling fluid cleaning system as claimed in claim 31 in which each pivotable leg is pivotally connected to the settling tank at a lower end and pivotally connected to the surface at an upper end, and the actuating system comprises at least one cable of variable length having a first end of the cable attached to at least one of the legs, the at least one cable being extendable to allow the legs to pivot to the generally horizontal alignment and retractable to pull the legs to the generally vertical alignment.

33. A drilling fluid cleaning system as claimed in claim 32 in which the surface is supported by four pivotable legs and the at least one cable comprises a cable attached to each of two of the legs.

34. A drilling fluid cleaning system as claimed in claim 33 in which each of the cables is attached to a piston arm of a cylinder at a second end of the cable, and the cable extends and retracts by virtue of extending and retracting of the piston arm.

35. A drilling fluid cleaning system as claimed in claim 34 in which each cylinder is mounted to an end wall of the settling tank.

36. A drilling fluid cleaning system as claimed in claim 31 in which each pivotable leg is pivotally connected to the settling tank at a lower end and pivotally connected to the surface at an upper end, and the actuating system comprises at least one telescoping cylinder pivotally connected at each end of the cylinder to the surface and at least one of the pivotable legs, the telescoping cylinder being extendable and retractable to control the angle between the surface and the at least one pivotable leg in order to raise and lower the surface.

37. A drilling fluid cleaning system as claimed in claim 36 in which there are two telescoping cylinders associated with two pivotable legs.

38. A drilling fluid cleaning system as claimed in claim 31 including an access ladder and walkway mounted to at least one of the pivotable legs such that the ladder and walkway are positioned within the settling tank when the pivotable legs are pivoted to the generally horizontal alignment.

39. Apparatus for removing solids from a fluid/solid mixture comprising, in combination:

a platform;

a region defined on the platform to retain solids;

a settling tank on the platform having at least an inlet chamber for receiving the mixture and an outlet chamber, the settling tank acting to separate the mixture into an upper fluid fraction and a lower solids fraction as the mixture flows from the inlet chamber to the outlet chamber; and at least one centrifuge on the platform in fluid communication with the settling tank and movable between a stored position and an operating position.

40. Apparatus for removing solids from a fluid/solids mixture as claimed in claim 39 including a flocculent source on the platform for adding flocculent to the fluid to promote separation of solids.

\* \* \* \* \*